Patented Aug. 6, 1940

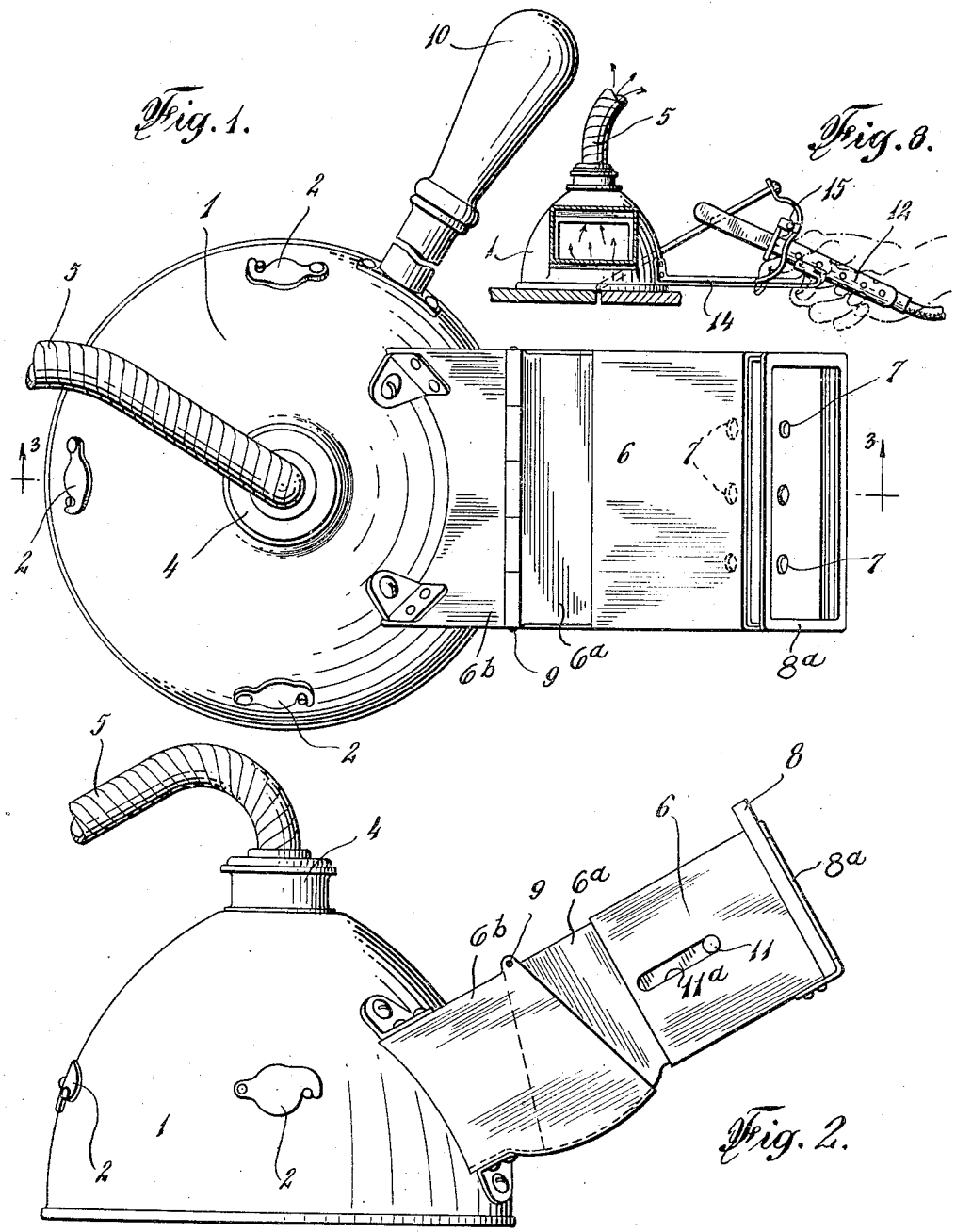

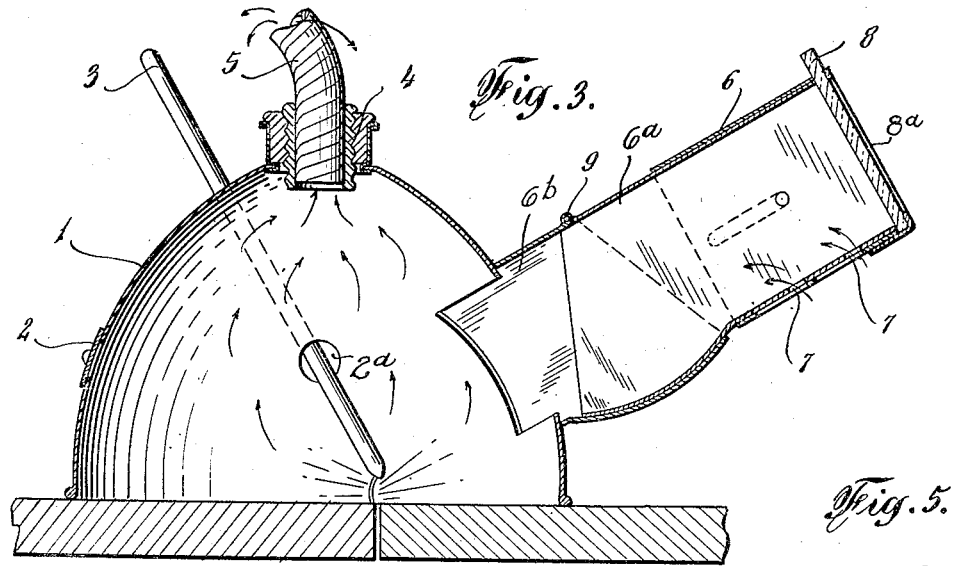
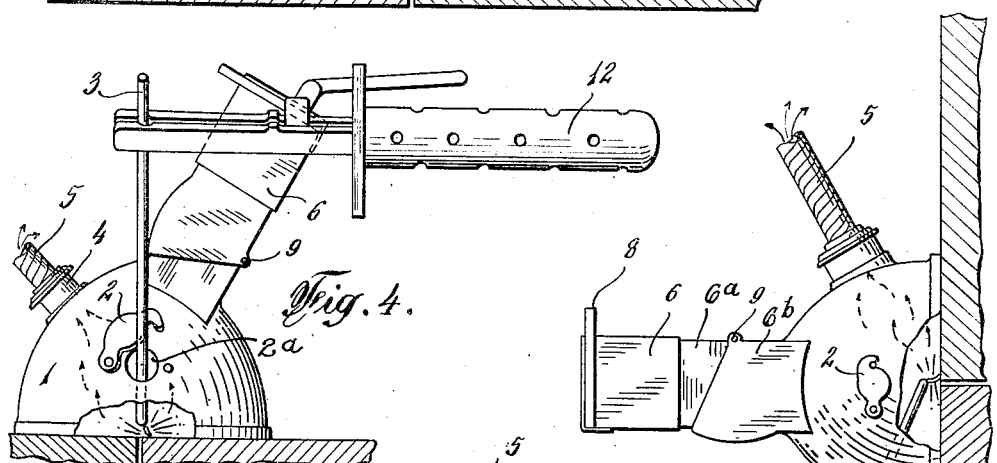
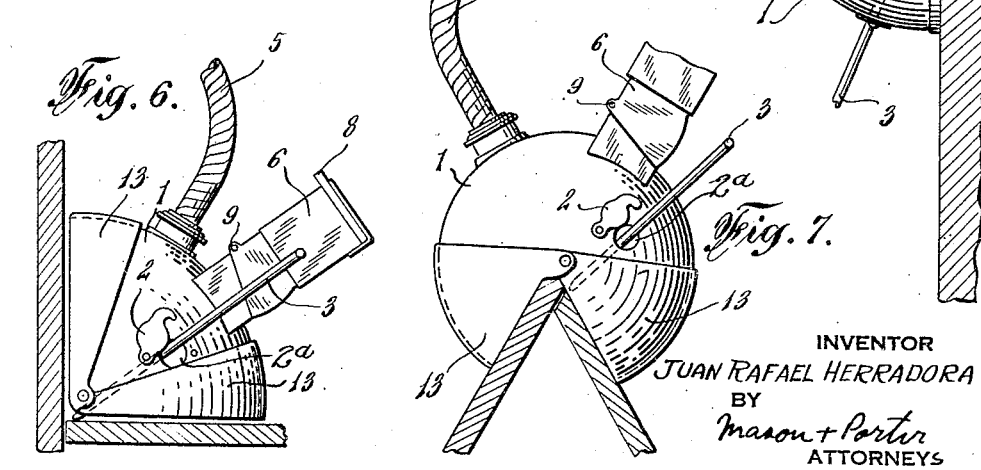

2,210,370

UNITED STATES PATENT OFFICE 2,210,370

PORTABLE PROTECTIVE CHAMBER FOR ARC WELDERS

Juan Rafael Herradora, Jersey City, N. J.

Application August 2, 1938, Serial No. 222,579

5 Claims. (Cl. 219—8)

It is well known that electric arc welding involves certain hazards to the operator due to inhalation of noxious gases produced by the high temperature of the arc, irradiations such as ultraviolet and infra-red rays, also metals in finely divided particles, and fumes, which in certain proportions may eventually lead to pathological changes of a serious character in the lungs.

The purpose of this invention is to eliminate these hazards and do away with the use of cumbersome and uncomfortable protective devices such as masks, respirators, goggles, etc.

This invention substantially consists of a portable chamber provided with a handle, which completely encloses the electric arc, employed in conjunction with a suction mechanism to draw and carry away the noxious gases, emanations and dust out of the working space or room. This chamber has a telescopic extension carrying a sliding window of black or other colored glass which is opaque to visually harmful radiations from the arc.

The chamber has one or more orifices for the insertion of the welding electrode and is fitted with a rotary or swiveling connection for a tube leading to a suction mechanism for ejection of the gases, fumes and dust resulting from the welding process.

The chamber is made of opaque, light-weight, heat-resisting and dielectric material, such as Bakelite, etc.

The operator holds the electrode as usual in his right hand, the chamber in his left hand, inserts the welding wire through the orifices of the chamber and observes the work through the colored glass. The chamber may also be permanently attached to the electrode holder to permit operation with a single hand.

Embodiments of the invention are shown in the accompanying drawings, in which:

Figure 1 is a top plan view of a protective chambered structure according to this invention.

Figure 2 is a side elevation of the same.

Figure 3 is an upright section, substantially on line 3—3 of Figure 1.

Figure 4 is a side elevation of a modified form of construction.

Figure 5 is a side elevation of another modification shown as employed for welding work having a vertical wall.

Figures 6 and 7 are side elevations of further modifications in construction, as employed with a piece of work having parts disposed at an angle to one another.

Figure 8 is a side elevation, on a smaller scale, of a further modification, in which the welding rod holder is connected to the chambered structure.

In these drawings, the chambered structure 1 has one or more orifices 2a, the orifices being provided with closure members 2 so that all of the openings except the one in prevailing employment may be sealed. These orifices are utilized for the insertion of the welding wire 3, so that the wire may be brought into its operating position at or adjacent the welding point. A rotary connection 4 is provided at the top of the structure in Figures 1 to 3, for receiving the exhaust tube 5 which is extended to a suitable means for withdrawing air from the chamber, along with noxious gases, dust, etc. The chambered structure has a telescopic structure including the end piece 6, an intermediate section 6a and a section 6b which is secured to the chambered structure 1. The sections 6a and 6b are connected together by a hinge 9 so that the end portion of the extension may be moved to different angles, being held thereat by the friction between the parts. Similarly, the end portion 6 of the telescopic extension has a slot 11a for receiving a stop pin 11 mounted on the intermediate section 6a, whereby the telescopic movement is limited and controlled. At the free end of the section 6 of this extension, is provided a resilient clamping member 8a for holding a black or other colored glass 8 through which observation may be made of the work being done.

The extension is provided with apertures 7 through which the air may enter the extension and flow therealong toward the interior of the chambered structure 1. It is preferred to have these apertures located at the lower side of the extension, and preferably near the inspection window 8, so that the suction produced through the discharge conduit 5 will cause air to move into the extension and flow therealong and thereby prevent the collection of dust, etc., on the inner face of the inspection window 8.

In the form of construction shown in Figures 4 and 5, two pieces of metal may be welded, the pieces being located in a horizontal or a vertical plane. For such conditions, the telescopic extension 6 and the suction connection 5 may be located at different parts of the chambered structure 1 in order to facilitate observation of the work. In Figure 4, the regular electrode holder 12 is illustratively shown engaged with the welding rod or wire 3.

In Figures 6 and 7, further modifications have been made in the chambered structure, to adapt it for welding work which has portions located at an angle to one another. In Figure 6, the angle is a re-entrant one, or a so-called inside angle; while in Figure 7, the parts are at an acute or outside angle. In each case, the chambered structure 1 has a wall provided with the hinged members 13 which may be moved to position and close engagement with the exposed faces of the work.

In Figure 8, the chamber is solidly attached to the electrode holder 12 by a connecting arm 14, so that the device may be positioned and held by the same hand which supports and guides the electrode rod or wire itself. The spring and lever attachment 15 is properly positioned for feeding the welding wire through the wall of the chambered structure 1, as required by the necessities of the work.

What I claim is:

1. A portable protective device for welders, comprising a chambered structure for enclosing the welding point and having an opening therein through which the work is exposed to the interior of the structure and being at least in part of electrically-insulating material and having a further opening through said electrically-insulating material, said further opening permitting the insertion of a welding rod so that the inner end of the welding rod may be operatively positioned at and adjacent the welding point, a holder for the welding rod connected to and forming a handle for the portable device, a connection to means through which gas and particles may be drawn off from the interior of the structure, and a hollow extension from the structure and provided at its inner end with an inspection window, said extension having an aperture therein for the flow of air inwardly through the aperture and opposite the said window so that the admitted air is effective for removing dust and particles from said extension into the interior of the structure.

2. A portable protective device for welders, comprising a chambered structure for enclosing the welding point and having an opening therein through which the work is exposed to the interior of the structure, said chambered structure being at least in part of electrically-insulating material and comprising angularly telescoping parts adjacent the opening therein whereby the structure will fit tightly against a piece of work and permit operation on parts disposed at an angle to one another, one of said telescoping parts having a further opening through the electrically-insulating material for permitting the insertion of a welding rod so that the inner end of the welding rod may be operatively positioned at and adjacent the welding point, a connection to means through which gas and particles may be drawn off from the interior of the structure and a hollow extension from one of the telescoping parts and provided with an inspection window, said extension having an aperture therein for the flow of air inwardly through the aperture and opposite said window so that the admitted air is effective for removing dust and particles from said extension into the interior of the chambered structure.

3. A portable protective device for welders, as claimed in claim 2, wherein a holder is provided for the welding rod, said holder being connected to and forming a handle for manipulation of the portable device.

4. A portable protective device for welders, as claimed in claim 2, wherein the said hollow extension is formed in two parts which are hinged with respect to one another for permitting angular positioning of said window.

5. A portable protective device for welders, as claimed in claim 2, wherein a plurality of openings are provided for insertion of the welding rod, said openings being located at various parts of the structure so that the welding rod may be presented to the work at different angles, and wherein closure members are provided for said plurality of openings whereby all of said openings with the exception of the one in prevailing employment may be sealed so that the suction means maintains a strong inward movement of air through the aperture in said extension.

JUAN RAFAEL HERRADORA.